United States Patent Office
2,736,669
Patented Feb. 28, 1956

2,736,669

METHOD OF ACTIVATING AND ESTERIFYING THE SURFACE OF FINELY DIVIDED PARTICLES OF SILICA HAVING SURFACE SILANOL GROUPS

Max T. Goebel, Landenberg, Pa., assignor to E. I. du Pont de Nemours and Company, Wilmington, Del., a corporation of Delaware No Drawing. Application December 11, 1951, Serial No. 261,140

4 Claims. (Cl. 117—54)

This invention relates to the surface modification of finely divided siliceous solids and is more particularly directed to processes for surface modifying supercolloidal particles of inorganic siliceous solids having specific surface areas of at least 25 square meters per gram which comprise heating the particles at a temperature of from 300° to 800° C. for a period sufficient to activate the surface of the solid particles and to reduce their specific hydroxylated surface area to less than 85 per cent of their specific surface area, and chemically reacting surface groups of the heat activated siliceous particles with a monohydric alcohol having at least 2 carbon atoms, wherein the carbon atom attached to oxygen is also attached to at least one hydrogen atom.

The process of dehydrating the surface of silica particles has been accomplished many times. Ordinarily, this has been done to change the ability of the silica to pick up more water so that silica gel, for instance, can thereafter adsorb more water.

The surface structure formed by heating silica gel is rapidly hydrated by water at even ordinary room temperature. The heat-treated particles return quickly and easily to their original state. Maintenance of silica surfaces in the dehydrated state is difficult.

Moreover, an increasing number of industrial applications are requiring silicas having reduced adsorption capacities, for instance, in the rubber filler field. Commercial needs for hydrophobic and organophilic siliceous products are also multiplying rapidly.

According to the present invention, siliceous solids in a supercolloidal state of subdivision having specific surface areas of at least 25 square meters per gram (m.²/g.) and surface silanol groups are surface-modified by heating them at a temperature from about 300° to about 800° C., and thereafter chemically reacting the solids having heat-activated surfaces with a monohydroxy alcohol of the class having at least 2 carbon atoms, wherein the carbon atom attached to oxygen is also attached to at least one hydrogen atom. The surface-modified siliceous solids are organophilic and in some instances also hydrophobic.

The term "specific surface area" as used herein means the ratio of exposed surface, as determined by nitrogen adsorption, to the mass of the particles. When the specific surface area or the area per unit mass of the supercolloidal siliceous particles is relatively large, as it is in the products prepared in accordance with the processes of this invention, the nature of those surfaces is a major factor governing the chemical and physical behavior of the particles. The nature of the surfaces becomes very significant when the specific surface area is 25 m.²/g. or more.

According to the processes of my invention hydrated amorphous silica, having a specific surface area of at least 25 m.²/g. is heated, preferably in the presence of air, to a temperature within the range of from 300 to 800° C. for a period sufficient to produce activation, say, for instance, one hour, and is then cooled in a dry atmosphere. The surfaces of the silica particles are thereby partially dehydrated and activated toward reaction with alcohols. The specific hydroxylated surface area is reduced to less than 85% of the specific total surface area. The term "specific hydroxylated surface area," discussed more fully hereinafter, refers to the area, believed to contain silanol (—SiOH) groups, on which methyl red dye will adsorb.

During the heating of the siliceous material according to the processes of the invention water is evolved and other changes occur upon its surfaces. The exact nature of these changes and the mechanisms by which they occur is not fully understood. Thus, the water evolved is not merely surface-adsorbed water, but results in part from chemical changes in the surface silanol groups. During this heating process, air or oxygen may be involved in the mechanism, whereby hydroxyl groups are "removed" from the surface. At any rate, an activated silicon-oxygen surface results, and I have called this an activated siloxane surface, to distinguish it from the silanol surface.

While the precise nature of the silicon-oxygen chemical linkages on the surface of the heated silica is not known, the linkages are the result of unusual changes which cause an increase in the activity of the surface toward chemical reaction with alcohols.

Following the dehydration step (also referred to herein as the activation step) the silica is treated with an excess of a primary or secondary monohydric alcohol having at least 2 but preferably not more than 18 carbon atoms. The alcohol-silica slurry is heated at a temperature of about 100° C. or higher for a period of about one hour. The surface-modified silica so produced is collected by filtration and dried.

Alternatively, the silica particles having heat-activated surfaces can be reacted with a primary or secondary monohydric alcohol, having at least 2 but preferably not more than 18 carbon atoms, in the vapor phase in a static or in a flow system.

For instance, a quantity of silica heat treated at about 500° C., which has been cooled to room temperature in the absence of atmospheric moisture, is placed in a closed vessel with about 5% by weight of n-butanol. The resulting mixture consisting of silica and n-butanol is heated in the closed container for a period of about one hour at a temperature of about 100° C. During the heating period surface esterification occurs. The excess butanol vapor can be removed by evaporation. The resulting powder is organophilic. About 150 ester groups per 100 square millimicrons of surface area have been chemically reacted. This product is not hydrophobic but is preferably wettted by n-butanol. The product passes into the butanol layer when shaken in a two-phase system of water and n-butanol.

The extent of dehydration of the surfaces of the siliceous substrate is a function of the temperature to which the hydrated siliceous material is heated before the alcohol treatment. More extensive dehydration occurs at the higher temperatures. For instance, the specific hydroxylated surface area of the hydrated siliceous material as measured by the adsorption of methyl red dye can be diminished by as much as 50% by heating the siliceous particles to a temperature slightly above 600° C. for a period of about 30 minutes. The specific surface area as determined by nitrogen adsorption remains substantially unchanged.

For the purpose of further illustrating my invention more detailed examples are given. The detailed examples will be better understood in the light of a more complete explanation of the invention. Accordingly, such examples have been placed at the end of the specification.

THE MATERIALS ACTIVATED AND ESTERIFIED

The materials which are treated according to the processes of my invention form the skeletons or internal structures of the new products. These materials are siliceous solids. They are preferably amorphous silica. They may be water-insoluble metal silicates having a coating of amorphous silica, such as would result from the partial acid treatment of mineral silicates or from the deposition of amorphous silica on their surfaces, say, for instance, by treatment with sodium silicate and an acid under controlled conditions. In any event, the siliceous solids should have surface silanol groups (—SiOH) and preferably their surfaces are substantially covered with silanol groups. These materials are inorganic. They contain substantially no chemically bound oragnic groups.

The siliceous solids which are surface-reacted in accordance with my invention should be free from substantial quantities of free alkali and other materials which may cause fusion or sintering of the particles at elevated temperatures with resultant undesirable reduction in the specific surface area. While a small percentage, say, of the order of 1 to 2% of salts such as, for instance, sodium sulfate, can be tolerated, it is preferred to keep even impurities of this type to a minimum. The surface metal ions or alkali impurities which interfere with the heat activation and esterification may be removed by an acid treatment of the siliceous material.

The particles of siliceous material subjected to the processes of my invention have at least one dimension of at least 150 millimicrons. Thus, they are in a super-colloidal state of subdivision. Nevertheless, the particles have large surface areas in relation to their mass, their average specific surface area being at least 25 m.$^2$/g. The value 25 m.$^2$/g. corresponds to the specific surface area which the particles would have if they were essentially spherical, dense, discrete, non-porous silica particles having a diameter of about 100 millimicrons.

The siliceous materials used in the present invention have, as already indicated, a specific surface area of at least 25 m.$^2$/g. and additionally have one dimension of at least 150 millimicrons. This arises from the fact that the particles may be either elongated, fibrous, or plate-like having at least one dimension less than 100 millimicrons, or preferably, that they are coherent aggregates made up of utilmate units which are so firmly attached to each other that they are not readily separated by simple stirring in fluid medium.

In most instances, the solids used in the processes of my invention consist of coherent aggregates having an average diameter of at least one micron. At this size, or above, the inorganic siliceous solids are readily removed from suspension in liquid medium by filtration. Once the filter cake is formed on the filter paper, the cake tends to trap particles down to about 150 millimicrons in one dimension. Smaller particles tend to pass through the paper.

Preferably, inorganic siliceous solids having numerous pores, voids, or interstices therein are used. These materials are porous. By this I mean that they have exposed surfaces in the interior of the particles which are connected to the exterior, so that liquids and gases can penetrate the pores and reach the exposed surfaces of the pore walls. In other words, the solid forms a three-dimensional network or webwork, to which the pores or voids or interstices extend as a labyrinth of passages or open spaces. Expecially preferred is amorphous silica in the form of porous coherent aggregates of extremely small, non-porous, substantially spherical, ultimate silica units, which are joined in very open networks to give a large pore size.

The average pore diameter should be at least 4 millimicrons. This is in contrast to conventional silica gels in which the ultimate spherical units are usually below 5 millimicrons in diameter, and are so closely packed that the pores or interstices are very tiny. When the pores are smaller than 4 millimicrons, the higher alcohols, particularly the $C_{18}$ straight chain alcohol in which the molecule is about 2 millimicrons in length, penetrate the pores with difficulty. When attached to the exposed surface of the pore walls, the alcohols must fill the pores almost completely. On the other hand, where the supercolloidal aggregates have a looser structure and contain pores of at least 4 millimicrons average diameter, the surface is easily accessible to alcohol, and the structure is ordinarily weaker, mechanically. The coarser pores may be the result of a much looser packing of small ultimate units which can be 5 to 10 millimicrons in diameter. The pores can be large due to the fact that the ultimate units are larger, say for instance, 20 or 30 millimicrons in diameter. Thus, the spaces between the larger ultimate spherical units are naturally larger even in closely packed structures.

Pore volumes may be determined from the nitrogen adsorption isotherms, as described by Holmes and Emmett, in Journal of Physical and Colloid Chemistry, 51, 1262 (1947). The pore diameter values are obtained by simple geometry from an assumed cylindrical pore structure.

When these aggregates are made up of ultimate units joined in a fairly open three-dimensional network, they are pulverulent. They can be easily disintegrated to fine powders having particle sizes in the range of from 1 to 10 microns. These powdery particles retain the porous or network structure. The ultimate units are chemically bound together by siloxane bonds (Si—O—Si) so that the coherent aggregates can be properly thought of as chemical compounds of high molecular weight.

Since the coherent aggregates of porous inorganic siliceous solids have labyrinths of pores throughout their structures, and since the total exposed surface area of the pore walls is many times the exposed surface area on the external walls of said solid, the state of subdivision can vary widely without much change in the total exposed surface area of a given mass.

Nevertheless, there is a practical maximum particle size, as far as the processes of this invention are concerned, because in very large masses, for instance, several inches in diameter, the diffusion of the esterifying agent and water through the pores takes place very slowly, so that the esterification process may become impractical. It is, therefore, preferred to have the supercolloidal particles in a relatively finely divided condition in order to promote rapid interaction with the alcohol. Ordinarily, this means that the super-colloidal particles should be sufficiently fine to pass through, for instance, a screen having 100 meshes per linear inch. Particles which pass thru such a screen are powders. Powders are preferred.

One of the preferred siliceous solids which is surface-activated and esterified by the processes of the invention is precipitated amorphous silica. Amorphous silica can be obtained as a precipitate consisting of coherent aggregates of extremely small, non-porous, ultimate units. These aggregates are much smaller than can be produced by grinding. Such amorphous silica is further characterized by X-rays as lacking crystalline structure.

Finely divided silica powders of the type consisting of coherent aggregates of dense ultimate units of about 10 to 100 millimicrons' average diameter are preferred types of material to be esterified. The pore size problems are minimized. Moreover, such powders are especially easy to filter and process. Spherical units having diameters larger than about 100 millimicrons have specific surface areas less than about 25 m.$^2$/g. They are therefore not a preferred class for reasons already stated.

Precipitated amorphous silicas having specific surface areas of less than 600 m.$^2$/g. are preferred. In instances where the specific surface area of precipitated amorphous silica exceeds 600 m.$^2$/g. the ultimate silica units in the porous particles are often so extremely small that it is difficult to isolate the supercolloidal particles or aggregates in a dry state, at least under ordinary drying conditions, without bringing about a considerable collapse of the pore structure of the supercolloidal particles. Such collapse leads to the formation of a relatively dense mass which is hard to comminute and which has pores below 4 millimicrons in diameter.

It will be understood that it is possible to produce very voluminous aerogels, by processes of the prior art, having surface areas approaching 900 m.²/g. Such highly porous forms of silica can be surface dehydrated and esterified by the processes of my invention.

For the best comprehension of the types of silica which can be treated according to the present invention, reference is hereby made to the comprehensive disclosure of the copending application of Ralph K. Iler, U. S. Serial No. 171,759, filed July 1, 1950, now abandoned.

A suitable amorphous silica consisting of reinforced coherent aggregates of dense ultimate units may be prepared, for instance, from sodium silicate and sulfuric acid, as described in the copending U. S. application of Alexander, Wolter and Iler, Serial No. 244,722, filed August 31, 1951. In this process, dense ultimate silica units prepared by a variety of methods may be coalesced to supercolloidal aggregates, and silica caused to accrete to the aggregates by releasing active silica (from sodium silicate and sulfuric acid) in an aqueous suspension of the aggregates while maintaining the pH of the mixture at 8.0 to 11.0. The alkali metal ion concentration is kept below 1 N, and the temperature of the reaction is maintained from 60 to 125° C. The release of active silica is effected at a rate such that the specified surface area of the precipitated silica present decreases continuously. The products obtained have a basic structure which is strengthened and reinforced by the presence of dense, accreted silica, so that they may be dried directly from a liquid at ordinary temperatures and at atmospheric pressure, without collapse of the basic structure.

Another suitable form of a hydrated amorphous silica powder which can be used in the processes of my invention is one characterized as consisting of supercolloidal aggregates of ultimate units of from 10 to 50 millimicrons in diameter, described in Chemical Engineering 54, 177 (1947), which was available on the open market. It has a specific surface area of about 240 m.²/g. and a bulk density of about 0.064 g./cc. at 3 p. s. i. g.

A further form of amorphous silica which can be used is one characterized by being an aerogel having a specific surface area of about 160 m.²/g. as determined by nitrogen adsorption and a bulk density of about 0.087 g./cc. at 3 p. s. i. g. It is available on the open market under the trade name of "Santocel C."

Still another form of siliceous powder which can be used in the process of the invention is one characterized as consisting of supercolloidal aggregates of ultimate units having an average diameter of about 25 millimicrons, a surface area of about 100 m.²/g. and containing a small amount of calcium, say, about 2% by weight. It is available in the open market by the trade name of "Hi-Sil." This material is preferably acid treated to remove surface metal ions before it is used in the processes of my invention.

Numerous other amorphous silicas, and siliceous materials may also be used in the processes of the present invention. These are disclosed in the above-mentioned copending U. S. application of Ralph K. Iler, Serial No. 171,759, filed July 1, 1951.

ACTIVATION BY HEAT

After a suitable siliceous material is selected, it is heated at a temperature of at least 300° C. for a period of time sufficient to substantially lower its specific hydroxylated surface area. By substantial lowering of the specific hydroxylated surface area of the siliceous product, I mean that the specific hydroxylated surface area will be less than 85% of the specific surface area. As a practical matter, the heating period should not exceed about 2 hours. There is, however, no harm in heating for longer periods. In fact, longer periods of heating may be required at the lower temperatures in order to obtain satisfactory activation.

The preferred temperature for surface activating the siliceous material is from about 400° C. to about 700° C. At temperatures notably below 400° C., the activation (also referred to herein as dehydration) of the silica surface becomes so slow that it is not very practical. Adsorbed water may be removed from the silica at temperatures up to 250° C.. For the purposes of the present invention the temperature should be raised at least to 300° C. Below a temperature of 300° C. and particularly below 250° C. activation is undetectably slow.

At temperatures above 700° C. sintering becomes a factor. Undesirable reduction of the surface area and even reduction of the specific surface area below the minimum of 25 m.²/g. may occur due to sintering. The maximum temperature will depend, of course, upon the duration of the heating period.

The higher the temperature of activation (above 300° C.) the shorter the time required to drive off any particular amount of water. As a practical matter, when activating relatively large quantities of silica in bulk in a conventional furnace, temperatures higher than about 800° C. are not employed. Under such conditions sintering, which is indicated by the observed decrease in specific surface area, may become appreciable above about 700° C. The sintering effect is most noticeable with the very high surface area materials. When heating at the higher temperatures, particularly those in excess of 800° C., it is necessary to heat the silica for only very short periods, with the maximum silica surface exposed to the source of heat, in order that substantial activation will occur before sintering becomes appreciable.

Thus, it is necessary to avoid changes in the internal structure of the coherent silica aggregates which would result from the application of conventional calcining or ignition techniques. A stream of dry air or inert gas may be passed through the apparatus to facilitate removal of the water vapor. Alternatively, the apparatus may be continuously evacuated. It is preferred to heat the siliceous material in the presence of air. The aid stream serves to purge the siliceous material of any undesirable organic matter which may have been adsorbed on the silica during the course of its preparation.

Although neither the exact nature of the chemical changes which occur in the surface silanol groups upon heat treatment and dehydration of the silica, nor the exact nature of the resulting activated silicon-oxygen chemical linkages on the surface is known, treatment of the particular silicas according to the processes of my invention causes an increase in the activity of the surface toward chemical reaction with alcohols. Simultaneously, a decrease results in the adsorption capacities of the activated silica for certain organic electron donor compounds. These changes may be conveniently demonstrated by measuring the decrease in the adsorption of methyl red dye upon activation of the surface.

The methyl red adsorption test is carried out by agitating a suspension of a few tenths of a gram of a dried silica or esterified silica sample to be tested in 25 ml. of an anhydrous benzene solution containing 0.6 to 0.7 gram of the acid form of methyl red p-dimethylamino-azobenzene-o-carboxylic acid,

$(CH_3)_2NC_6H_4N=NC_6H_4COOH$ per liter. No more than about 0.7 gram of the sample should be used in the test. With voluminous samples less than 0.7 gram, say, for instance, 0.4 gram, should be used to avoid getting a mixture too thick to handle.

The amount of sample used in the methyl red adsorption test should provide, as near as possible, a total hydroxylated surface area of 10 m.² in the test. The test mixture is agitated for a period of about two hours at a temperature of about 25° C. to reach equilibrium conditions. An equilibrium concentration of 400 milligrams of dye per liter insures saturation adsorption.

The decrease in dye concentration in the benzene solution is determined by adsorption spectrophotometric observations at 4750 A. of both the original and equilibrium benzene solutions of methyl red. The specific hydroxylated surface area in m.²/g. is calculated from the formula:

$$\frac{\text{Grams dye adsorbed} \times 116 \times 10^{-20} \times \text{Avogadro's No.}}{\text{Grams silica employed} \times \text{molecular weight of methyl red}}$$

where the covering power of each adsorbed methyl red molecule is approximately 1.16 square millimicrons.

When the surfaces of the siliceous materials are dehydrated and/or esterified, the methyl red dye will not be adsorbed on the dehydrated or on esterified portions of the surface; that is, on the portions of the surface not covered by silanol groups. Consequently, measurement of the adsorption of methyl red dye before and after the siliceous material has been subjected to processes of my invention shows a decrease which is proportional to the decrease in exposed specific hydroxylated surface area.

Since the amount of dye adsorbed by the sample is measured by difference, the probable error, percentagewise, increases as the amount of adsorbed dye decreases. Thus, for specific hydroxylated surface areas of 100 m.²/g., variations of as much as 5 m.²/g. are possible. For samples which have a specific surface area of about 100 m.²/g. as determined by nitrogen adsorption, and which adsorb very little dye, a value for the hydroxylated surface area of less than 5 m.²/g. is considered to be essentially zero.

The activation can be carried out in any appropriate vessel or apparatus. For instance, the silica may be heated in an apparatus commonly used for heating pigments and for driving off water. Means for the introduction of air may be provided.

It will be understood that after the activation treatment, the silica should be kept out of contact with liquid water or with water vapor at high relative humidities. This avoids rehydration and deactivation of the surface. While I prefer to bring the activated silica immediately into contact with an alcohol being used as the surface esterifying agent, the activated material may, if desired, be stored in a dry atmosphere.

The siliceous materials heated in the manner described above are pulverulent solids which possess surfaces highly reactive toward primary and secondary monohydric alcohols. This reactivity is substantially greater than that for the nonactivated, fully hydrated silicas. Under substantially identical conditions of temperature, time, type, and water content of alcohol, I have found that the esterification reaction proceeds to a greater extent with a heat-activated silica than with a non-activated hydrated portion of the same silica.

Furthermore, a given amount of esterification, say, for instance, 100 ester groups per 100 square millimicrons of surface area of the substrate, can be obtained at a lower temperature using heat-activated siliceous material than using non-activated hydrated silica.

THE SURFACE ESTERIFICATION PROCESS

According to the invention, the heat-activated silica is dried and cooled in an anhydrous atmosphere. It is then mixed with an alcohol. The reaction between the dehydrated surfaces of the silica and the alcohol is referred to herein as surface esterification. The alcohol, which serves as an esterifying agent, is preferably present in an amount at least sufficient to react with the total surface of the silica. The amount of alcohol to use can be calculated on the basis of the specific surface area of the silica as determined by nitrogen adsorption.

A method for determining the surface area by nitrogen adsorption is described in "A new method for measuring the surface areas of finely-divided materials and for determining the size of particles," by P. H. Emmett in the "Symposium on New Methods for Particle Size Determination in the Subsieve Range," published by the American Society for Testing Materials, March 1941, p. 95. The value of 0.162 square millimicron for the area covered by one surface adsorbed nitrogen molecule is used in calculating these specific surface areas.

More simply, the amount of alcohol necessary to react with the total surface of the silica can be determined by experiment to see just how much is required. It will be understood that it is not necessary to use an amount of alcohol sufficient to react with the total surface. In the event that a partial treatment is desired, less than the determined amount may be employed.

Ordinarily, the most useful products are those which have surfaces largely covered by ester groups and are consequently stable toward hydrolysis. Thus, it is preferred to esterify as much of the total surface as possible. It will be understood that those portions of the activated surface which have not been chemically altered by interaction with an alcohol are readily hydrated when placed in contact with liquid water or with an atmosphere in which the relative humidity is greater than about 50%. But they are sufficiently stable to be handled by conventional procedures at relative humidities below 50%.

Highly esterified siliceous materials are particularly preferred since they exhibit maximum organophilicity and hydrophobicity. However, even those products in which only a portion of the surface groups are reacted with alcohol have a very low adsorption capacity for organic electron donor compounds, such as, for instance, rubber accelerators and dyes. Hence they are very useful materials.

The ratio of alcohol to siliceous material is limited by the fact that sufficient alcohol should be present to provide (1) an adequate excess over that consumed in reaction, and (2) a sufficiently high concentration of alcohol on contact with the siliceous material to facilitate a practical rate of reaction. For instance, in the treatment of siliceous material having a surface area of about 100 $m^2/g$, the ratio of alcohol to siliceous material may range from about 5% of alcohol, based on the weight of the siliceous material, as, for example, in the vapor phase reaction, to several times the weight of siliceous material. In the latter instances a slurry of the silica in liquid alcohol is obtained.

Where the added alcohol is present in a quantity so small that the resulting mixture remains as an apparently dry powder, for instance, in the vapor phase reaction, the mixture consisting of heat activated silica and alcohol is placed in a closed container and heated to a temperature of 100° C. or higher but not exceeding the decomposition temperature of the alcohol, preferably within the range of from 100 to 200° C., for a period of about 1 to 2 hours. The heat activated silicas may, however, be esterified at temperatures as low as about 30° C. This may be desirable particularly when relatively unstable alcohols such as unsaturated alcohols are employed.

Heating the mixture of heat activated silica and alcohol serves to vaporize the alcohol and facilitates its spread throughout the dry powdered siliceous mass. Heating also accelerates the esterifying reaction of the alcohol with the dehydrated surface.

Any of a wide variety of conventional reaction vessels may be used for bringing about the reaction of the alcohol with the siliceous substrate having activated surfaces. There may be used, for instance, closed steel or glass-lined kettles, preferably fitted with internal agitator, and having internal or external heating surface and a reflux condenser. Reactors of this type are especially well suited for alcohols, such as, for instance, n-butyl alcohol which boils at 118° C. Surface esterification reactions using alcohols of this type can be effected in the liquid phase at atmospheric pressure. An autoclave is particularly preferred for the vapor phase reaction of a lower alcohol with the siliceous substrate at temperatures in the neighborhood, of say 200° C.

There is a definite time-temperature relationship for the esterification reaction, as is true for all chemical reactions. In this reaction, however, at any given temperature the practical extent of reaction varies with the type of alcohol used. Short chain primary alcohols react more rapidly than long or highly branched chain alcohols. In general, primary alcohols react more rapidly and more completely at a given temperature than do secondary alcohols.

There is a maximum temperature at which the reaction of alcohol and siliceous material can be effected. If the temperature is too high, thermal decomposition of the organic material present will occur. The temperature should, of course, not exceed the thermal stability of the esterified products.

Secondary alcohols are less stable than primary alcohols. With some secondary alcohols decomposition occurs at temperatures only slightly above 300° C. In view of the general instability of alcohols, both primary and secondary ones, at high temperatures, say, 600° C., it is preferred not to prolong the heating of the reaction mixture any more than necessary to achieve esterification equilibrium.

In those instances wherein the vapor phase esterification reaction is effected in the presence of air at a temperature above 200° C., the heat activated silica may exhibit a catalytic effect and oxidation or other decomposition of the alcohol may occur. The amount of desired esterified product obtained is decreased. Furthermore, it may be contaminated with organic decomposition products. It is, therefore, preferred in these instances to carry out the esterification at a temperature below about 200° C.

After completion of the esterification reaction, the solid esterified siliceous product can be isolated. When the reaction is carried in the liquid phase, the solid product can be removed from the alcohol suspension by filtration. This presents no difficulty. The siliceous solid consists of particles of super-colloidal size and can be retained on ordinary filter media. The product may then be dried, say, for instance, in a vacuum oven. The excess alcohol remaining after completion of the vapor phase reaction can be removed from the esterified product by exhaustive evacuation at elevated temperature, say, at 60° C. and $10^{-5}$ mm. of mercury pressure.

Alcohols which distill readily at atmospheric pressure without decomposition can, of course, be removed from the siliceous solid simply by distillation. They may also be dried in an oven which is preferably fitted with a vapor recovery system.

Since the higher alcohols are not readily distilled except under very high vacuum, a more convenient method for removing excess higher alcohol from the esterified product is to extract the latter with any of well known low boiling organic solvents. There may be used, for instance, methyl ethyl ketone, chloroform, or ether. Since the surface-esterified siliceous solid is supercolloidal, it can be separated from the extraction medium readily by filtration or by centrifuging. After the higher alcohol has been completely removed, the solvents may be evaporated from the product. A dry product remains.

The maximum temperature to which the activated silica and alcohol can be heated should not exceed, as previously indicated, the decomposition point of the esterified layer. For a surface containing n-butoxy groups decomposition occurs at a temperature of about 300° C. It may be noted that the temperature employed for esterification is somewhat lower than the temperature at which the activation of the siliceous solid is preferably conducted. Thus, a suitable siliceous material can be first heated at a high temperature, say, in the range of 400°-700° C., and then chemically modified with an alcohol at a lower temperautre, say, for instance, 200° C. One need not permit the heat-activated silica to completely cool to room temperature prior to surface esterification. A process utilizing this principle is of utmost practical value inasmuch as valuable time is saved and the possibility of moisture pick-up is minimized.

THE ESTERIFYING AGENT

In the process of this invention, the surface esterifying agents used are primary and secondary monohydric alcohols having at least 2 but not more than 18 carbon atoms. Thus, the esterifying agents can be defined as compounds of the formula ROH, wherein R is a hydrocarbon radical having from 2 to 18 carbon atoms wherein the carbon attached to oxygen is also attached to at least one hydrogen atom.

Examples of compounds of this class are normal straight chain alcohols such as ethyl, n-propyl, n-butyl, n-pentyl (amyl), n-hexyl, n-heptyl, n-octyl, n-nonyl, n-decyl, n-undecyl, n-dodecyl (lauryl), n-tetradecyl (myristyl), n-hexadecyl (cetyl) and n-octadecyl (stearyl); branched chain primary alcohols such as isobutyl (2-methyl-1-propanol), isoamyl (3-methyl-1-butanol) and 2,2,4-trimethylhexane-1-ol; secondary alcohols such as isopropyl, sec-butyl (2-butanol), sec-amyl (2-pentanol), sec-n-octyl (methyl hexyl carbinol) and diisopropylcarbinol (2,4-dimethylpentane-3-ol).

Examples of alicyclic alcohols of this class are cyclopentanol, cyclohexanol, cycloheptanol (suberol) and menthol. Examples of alcohols of this class having ethylenic unsaturation are allyl (2-propene-1-ol), crotyl (2-butene-1-ol), oleyl (cis-9-octadecen-1-ol), citronellol (3,7-dimethyl-6(or 7)-octen-1-ol), and geraniol (3,7-dimethyl-2,6-octadien-1-ol). Acetylenic unsaturation is illustrated by propargyl alcohol (2-propyn-1-ol). Aromatic alcohols (araliphatic) are illustrated by benzyl (phenyl carbinol), beta-phenyl-ethyl (2-phenyl-ethanol), hydrocinnamyl (3-phenyl-1-propanol), alpha-methylbenzyl (1-phenyl-ethanol), and cinnamyl (3-phenyl-2-propene-1-ol).

The saturated primary and secondary alcohols are preferred. In this case the resulting ester groups are alkoxy groups. Amongst the aromatic alcohols, those having only one aryl group attached to the carbon of the carbinol radical are preferred.

The saturated primary alcohols are particularly preferred esterifying agents because they react more readily and at lower temperatures than do secondary or tertiary alcohols. They are also more stable than tertiary alcohols and unsaturated alcohols at the temperatures of the reaction.

It will be understood that by processes of my invention siliceous materials having activated surfaces can be surface esterified to a high degree even with primary and secondary monohydric alcohols which are relatively unstable at temperatures of about 200° C. or higher.

Generally speaking, the unsaturated alcohols are somewhat difficult to use due to possible formation of by-products. Hence they are not preferred for many purposes. However, for certain uses, such as incorporation of the esterified silica as a reinforcing filler in certain organic polymers, the silicas esterified with unsaturated alcohols are highly preferred. This is so because subsequent treatment may result in copolymerization of the unsaturated —OR groups on silica with active unsaturated linkages in the partially polymerized organic polymer.

Technically, there is no upper limit to the number of carbon atoms which can be present in the esterifying agent. As a practical matter, the groups of alcohols having 2 to 18 carbon atoms include the majority of commercially available monohydric alcohols and offer a selection of organic molecule sizes which should be adequate for any purpose. Alcohols in this range are preferred because the resulting esterified products are relatively stable towards hydrolysis. The fully esterified products are hydrophobic.

The alcohols having from 3 to 6 carbon atoms are particularly preferred because they are relatively low boiling liquids and are readily handled in the process. When present as unreacted excess these lower alcohols can be most readily removed from the esterified product by drying in a vacuum oven without the necessity of extraction procedures. They are also the most economical to use. Only a minimum quantity of the organic reagent is needed to obtain the desired surface characteristics. They yield products having a low ratio of organic matter to silica which is very desirable for certain uses.

Tertiary alcohols are much less reactive than the primary and secondary alcohols. They are also lacking in stability at the higher temperatures. Thus, tertiary alcohols are not used in this invention.

While methyl alcohol will react with the siliceous material to form a surface of methoxy groups, the resulting product is not stable toward hydrolysis even under mild conditions. Furthermore, the product is not hydrophobic even when the surface is crowded with methoxy groups.

The esterifying agent need not be a single alcohol. Mixtures of alcohols can be used. For instance, a mixture of isobutyl and sec-butyl alcohol may be used. Also, there may be used a mixture of different chain lengths such as is found in technical grades of lauryl alcohol made from cocoanut oil ("Lorol"), in technical oleyl alcohol made from lard and in technical stearyl alcohol made from tallow.

It will be understood that the character of the alcohol selected depends upon the particular use to which the product will be put. For instance, if esterified silicas are to be used in paints, the alcohols selected should be readily compatible with the alkyd resins or with other materials which constitute the base of the particular paint. Also, for esterified silicas to be used in plastics, the selection of an alcohol will depend upon the plastic.

In order for surface esterification to proceed to a practical degree of completion, the water content of the alcohol employed should be maintained below about 3 per cent by weight. In other words, the water content of the reaction system during the surface esterifying reaction should be maintained below 3 per cent based on the alcohol in the system. The optimum results are obtained when the alcohol is practically anhydrous.

As already mentioned, it is particularly preferred to have the alcohol present in the system in such excess of the amount theoretically necessary for the complete reaction that free alcohol is present.

By practical degree of completion I mean that there must be enough chemically attached surface —OR groups, where R is a hydrocarbon radical having at least 2 but not more than 18 carbon atoms, wherein the carbon atom attached to oxygen is also attached to at least 1 hydrogen atom, to significantly change the surface characteristics of the material. The —OR groups are referred to herein as ester groups.

THE ESTERIFIED PRODUCT

Most of the products of the invention are powders. In some instances the products may be in the form of lumps or cakes. Usually, such lumps or cakes are pulverable under pressure of the fingers or by a light rubbing action. Some of these powders are so mobile and free flowing as to behave very much like a fluid.

The esterified amorphous silica aggregates are colorless or translucent. The bulk powder may appear translucent or, more often, white. The esterified metal silicates are often colored. In the absence of free alcohol, the products are odorless and tasteless.

The light, fluffy nature of the preferred products can be expressed by the gross characteristic of bulk density.

The method of measuring bulk density, which is expressed as grams per cubic centimeter (g. % cc.), is fully described in the copending U. S. application of Ralph K. Iler, Serial No. 171,759, filed July 1, 1950.

Briefly, the method comprises subjecting a known weight of the product contained in a cylindrical holder to a known compressive load applied through a plunger resting on the surface of the product. The bulk density under the particular compressive load is calculated by dividing the known weight of the product in grams by the measured volume in cubic centimeters of product at compression equilibrium.

Powders having bulk densities of about 0.2 g./cc. or below, under a compressive load of 3 pounds per square inch (p. s. i.) and about 0.30 g./cc. or below, at 78 p. s. i. are preferred.

These products can be compressed into pellets for handling and shipment and then easily reduced again to powders by milling The siliceous skeleton of the esterified product remains relatively unchanged during the surface esterification process. The inorganic siliceous solids which are preferred for the internal structure of the activated, esterified products are, consequently, those which have already been described as preferred starting materials for the processes of this invention.

The products of the invention possess —OR groups chemically bound to the surface of silica rather than mechanically adsorbed. The chemically bound —OR groups cannot be desorbed even under very high vacuum and relatively high temperatures. This is in contrast to adsorbed alcohols which are readily removed by high vacuum and elevated temperature.

The —OR groups chemically reacted with the silica surface cannot be removed by washing with hot methyl ethyl ketone or related solvents, nor by prolonged extraction in a Soxhlet extractor. The alcohol is not displaced from the silica by treatment with a solvent, such as, for instance, methyl ethyl ketone. This is in contrast to the displacement of one solvent by another, which is observed in the case of ordinary physical adsorption.

The reaction of alcohols with surface silanol or activated siloxane groups resulting in the formation of chemically bound ester groups should not be confused with the physical adsorption of alcohol. The latter in some instances is sufficiently strong as to make it difficult to remove such alcohol from the siliceous surface. However, physically adsorbed alcohols do not render the surfaces either organophilic or hydrophobic. The physically adsorbed alcohols can be removed by subjecting the material to high vacuum at relatively unelevated temperatures.

The esterified portions of the surfaces of the products of this invention are comparatively stable toward hydrolysis. The products which have a great number of ester groups per unit surface area, that is, those which show substantially no dye adsorption, are more stable toward hydrolysis than the lesser esterified products.

Since the esterification of this invention is a surface phenomenon, the effectiveness of the treatment may be measured by calculating the esterification in terms of the number of ester groups per 100 square millimicrons of surface area of the internal structure.

Thus, the esterification value "E" can be defined as the number of —OR groups per one hundred square millimicrons of surface area. It may be calculated by reference to the following equation:

$$E = \frac{6.02 \times 10^{23} \times C}{12n \times S_n \times 10^{18}} = \frac{50,200 \times C}{n \times S_n}$$

where C is the weight of carbon in grams attached to 100 grams of siliceous substrate, n is the number of carbon atoms in the —OR group, $S_n$ is the specific surface area in m.²/g. of the siliceous substrate as determined by nitrogen adsorption.

The surface area $S_n$ can be determined either on the siliceous material before esterification or on the siliceous skeleton after the ester groups have been removed by a process which does not affect the nature of the skeleton. Such a process for removal of ester groups comprises decomposing the esterified product by slowly heating it in a steam of oxygen up to a temperature of 500° C., maintaining the product at a temperature at about 500° C. for a period of about 3 hours, cooling and rehydrating the particles.

Where the type of alcohol used in esterification is known, it is only necessary to have a carbon analysis run and a determination made of the specific surface area of the siliceous material which is esterified in order to calculate the surface esterification.

On the other hand, where a sample is to be analyzed in which the type of alcohol is unknown, the sample may be decomposed with an acid. The alcohol can be recovered and identified so that the number of carbon atoms in the alcohol can be determined.

To render a siliceous material organophilic it is necessary to react a certain minimum proportion of the surface silanol or activated siloxane groups with an alcohol. The esterified silica becomes markedly organophilic when there are present on the surface more than about 100 ester groups per 100 square millimicrons.

A hydrophobic product usually requires at least 200 ester groups per 100 square millimicrons of surface, based on nitrogen adsorption methods on the unesterified surface. Even in the case of hydrophobic products, the surface need not be completely crowded with ester groups. There may still remain some exposed surface silanol groups, as evidenced by the fact that there still remains an appreciable specific hydroxylated surface area as measured by dye adsorption. In such instances, it is possible by using somewhat more stringent reaction conditions to force even more alcohols to react with the surface. The chemically reacted ester groups are thus crowded so closely together on the surface that the products show substantially no adsorption of methyl red dye. They are particularly stable.

Esterified siliceous products having many properties identical with those of the products of this invention are described and claimed in the copending U. S. application of Ralph K. Iler, Serial No. 171,759, filed July 1, 1950.

The products of the present invention are useful for any purpose in which it is desired to have a siliceous material in a finely divided form, having a high specific surface area of which little or no portion is hydrophilic, but which exhibits organophilic characteristics.

The products are uniquely suited for further incorporation into a variety of organic compositions, such as, for instance, paper, plastics, paints, greases, lubricants, waxes, elastomers, textiles, and the like. The products obtained in accordance with the process of the invention are also useful as diluents, extenders and anti-caking agents for insecticides. In fact, they may be used as estersils in all of the novel compositions disclosed in the U. S. applications of Ralph K. Iler, Serial No. 171,760, filed July 1, 1950, and Serial No. 191,717, filed October 23, 1950, now U. S. Patent No. 2,676,148.

The processes of the present invention offer the advantage of producing such products by simple, practical procedures which may be carried out under atmospheric pressure at very moderate and even relatively low temperatures in the presence of the alcohol. The processes have the advantage of using a dry silica as the starting material. This obviates any necessity for removing water by azeotropic distillation.

At any given temperature, the esterification of the heat activated silica within a given time is markedly greater than that which would be obtained using a non-activated hydrated silica. Any desired amount of esterification can be obtained at a lower temperature in a given time with the heat-activated silica than would be possible using non-activated silica as the starting material.

Furthermore, the esterification step of the processes of my invention may be carried out in the vapor phase using heat activated silica. This obviates the necessity of using tremendous excesses of the alcohol and permits the esterification reaction to be carried out in a practical continuous manner. Such advantages are of far-reaching practical significance.

In order that the invention may be better understood, reference should be had to the following illustrative examples:

*Example 1.—Coherent aggregates of ultimate silica units having average unit diameters of 25 millimicrons heated to 410° C. in vacuo and esterified with n-butanol in the liquid phase*

A solution of sodium silicate, having an $SiO_2:Na_2O$ mole ratio of 3.36, and containing 3.64 grams of $SiO_2$ per 100 milliliters, was heated to a temperature of 95° C. To ten volumes of this hot silicate solution 1 volume of a 2.9 N sulfuric acid solution was added over a period of one-half hour, at a uniform rate, and with vigorous agitation. The final $SiO_2$ concentration was 3.3% and 80% of the $Na_2O$ originally present in the sodium silicate solution was neutralized, that is, the final $SO_3:Na_2O$ mole ratio was equal to 0.8. The $Na^+$ ion concentration was maintained at less than 0.4 N throughout the process and the final pH of the sol was about 10.

In the manner described above an opalescent silica sol was prepared. The particles of the sol were about 15 millimicrons in diameter as determined from electric micrographs. Hereinafter, a silica sol so prepared will be referred to as the "heel."

To a "heel" prepared as already described there were added simultaneously with vigorous agitation equal volumes of sodium silicate solution ($SiO_2:Na_2O$ mole ratio of 3.36) and a sulfuric acid solution over a period of two hours. The temperature of the "heel" was maintained at 95° C. throughout the addition of acid and silicate. The concentration of the sodium silicate solution was about 6.6 grams of $SiO_2$ per 100 milliliters. A sufficient volume was added over the two hour period so that two parts of $SiO_2$ were added for each part of $SiO_2$ originally present in the "heel". The concentration of $SiO_2$ in the silicia sol or slurry was maintained at 3.3 grams of $SiO_2$ per 100 milliliters throughout the preparation. The concentration of the sulfuric acid (0.52 N) was adjusted so that at all times the ratio of $SO_3$ to $Na_2O$ in the solutions was 0.8. A pH of about 10 was maintained. The $Na^+$ ion concentration was maintained at less than 0.4 N throughout the process.

Early in the "build up" process the particles of silica present in the "heel" started to coalesce and precipitate. The final slurry was filtered. The wet filter cake was reslurried in water. It was coagulated with 0.2% by weight based on $SiO_2$ of a mixture consisting of equimolar portions of cetyl and lauryl trimethylammonium bromide. The pH of the cake was adjusted to about 8 with 4 molar sulfuric acid. The reslurry was filtered. The cake was collected, washed and dried. The soft, pulverable product was powdered in a Raymond Mill.

The dry powder consisted of coherent aggregates of coalesced ultimate dense units having an average unit diameter of 25 millimicrons as measured from electron micrographs and a specific surface area $S_c$=94 m.²/g. as calculated therefrom. The specific surface areas as measured by nitrogen adsorption ($S_n$) was 97 m.²/g. The specific hydroxylated surface area was 97 m.²/g. as measured by methyl red adsorption. Thus, the coalescence factor $S_c/S_m$ was 0.97.

A slurry of 4 grams of the silica in 40 cc. of distilled water had a pH of 8.2. The following results were obtained upon chemical analysis: 89.54% $SiO_2$, 0.23% carbon, 1.20% sodium, 4.95% $H_2O$ by Fischer titration, 2.26% non-siliceous ash, and 8.25% loss on ignition. The bulk density of the dry powder was 0.160 g./cc. at 3 p. s. i.; 0.239 g./cc. at 78 p. s. i.; and 0.492 g./cc. at 1560 p. s. i.; above atmospheric pressure.

A 3 gram sample of the dry particulate silica described above was heated under a vacuum of about $10^{-5}$ mm. of mercury for a period of two hours at a temperature of 410° C. During this heating period, approximately 2.8% water was removed from the sample. The sample was cooled in the absence of moisture and treated with 40 cc. of n-butanol which had been made anhydrous by refluxing with metallic calcium.

The slurry of silica in n-butanol was refluxed at a temperature of 118° C. for a period of two hours. Adequate precaution was taken to prevent the admittance of atmospheric moisture. The silica was then removed from the slurry by filtration, collected and dried for a period of 16 hours at a temperature of 110° C.

The product so obtained was organophilic and had a specific hydroxylated surface area as measured by methyl red adsorption of 54 m.$^2$/g. Upon chemical analysis, the product was found to contain 95.21% $SiO_2$; 0.70% C, and 0.88% H, and had a loss on ignition of 4.09%. The analysis corresponded to an esterification of 106 butoxy groups per 100 square millimicrons of silica surface of the substrate.

Thus, the heat-activated esterified silica was capable of adsorbing only about one-half as much dye as that of the untreated silica. There were a sufficient number of butoxy groups chemically reacted with the surface to change the surface characteristics from those of a hydrophilic, non-organophilic product to those of an organophilic product.

The actual number of butoxy groups per 100 sq. millimicrons of surface, already indicated, was substantially greater than the number obtainable by treating a non heat-activated hydrated amorphous silica with butanol under esterification conditions identical with those of the present example.

*Example 2.—Coherent aggregates of ultimate silica units having an average unit diameter of 25 millimicrons heated to 410° C. in air and esterified with n-butanol in the liquid phase*

A 1 gram sample of fine silica prepared as described in Example 1, and having a specific surface area of 97 m.$^2$/g., was heated for a period of one hour in a muffle furnace in the presence of air at a temperature of 410° C. Upon removal from the furnace, the silica sample was cooled to room temperature in a vacuum desiccator and slurried with an excess of anhydrous n-butanol.

The butanol-silica slurry was refluxed at a temperature of 118° C. for a period of two hours. At the close of the two hour period the silica was collected by filtration and dried at a temperature of 110° C. The product was organophilic and gave the following analysis: loss on ignition, 4.66%; silica, 94.46%; carbon, 1.26%; hydrogen, 0.8%.

On the basis of the above analysis the esterified product contained 187 butoxy groups per 100 square millimicrons of surface of the silica substrate. The value is almost double that of the parallel sample (Example 1) heated at 410° C. in vacuum. It demonstrates the preference for activating certain types of silica by heating in the presence of air rather than in vacuo.

*Example 3.—Coherent aggregates of ultimate silica units having 25 millimicrons-average unit diameter heated to 550° C. in air and esterified with n-butanol in the liquid phase*

Two 1 gram samples of particulate silica prepared as described in Example 1 and having a specific surface area of 97 m.$^2$/g. were heated for a period of one hour in a muffle furnace in the presence of air at a temperature of 550° C. The samples were cooled to room temperature in a vacuum desiccator. One sample was slurried with anhydrous n-butanol. The other sample was slurried with n-butanol which contained from 0.5 to 1% water. The slurries of silica and n-butanol were then refluxed for a period of about 2 hours at a temperature of 118° C. The silica was collected by filtration and dried at a temperature of 110° C.

The sample which had been heated in anhydrous n-butanol was analyzed and found to contain 94.16% $SiO_2$, 1.52% C, 0.78% H. Its loss on ignition was 4.89%. On the basis of this analysis the esterified product contained 200 butoxy groups per 100 square millimicrons of silica surface. The product was organophilic and hydrophobic.

On the other hand, the sample which had been heated in n-butanol containing from 0.5 to 1 per cent of water was organophilic, but not hydrophobic. The product was found by analysis to contain 94.81% $SiO_2$, 1.30% C, 0.62% H, and had a loss on ignition of 4.66%. The esterification amounted to 171 butoxy groups per 100 square millimicrons of silica surface of the internal structure.

This example demonstrates that more complete esterification can be obtained by the use of anhydrous alcohol. It further demonstrates, in comparison with Example 2, that a silica which has been activated at a higher temperature (550° C.) can subsequently be more highly esterified under a given set of conditions than one activated at a lower temperature (410° C.). The product esterified with anhydrous alcohol after heat activation at the higher temperature showed the most marked change in surface characteristics from those of a hydrophilic powder to one which is completely hydrophobic.

*Example 4.—Coherent aggregates of ultimate silica units having an average unit diameter of 25 millimicrons heated to 650° C. in air and esterified with n-butanol in the liquid phase*

A sample of particulate silica, prepared as described in Example 1, and having a specific surface area of about 97 m.$^2$/g., was heated in a muffle furnace at a temperature of 650° C. for a period of one hour in the presence of air. The resulting heat-activated silica was cooled to room temperature in the absence of moisture. It was then slurried in anhydrous n-butanol. The slurry was refluxed at a temperature of 118° C. for a period of about 2 hours, as described in Example 1. The silica was then removed from the slurry by filtration, collected and dried for a period of 16 hours at a temperature of from 120 to 130° C.

The product thus obtained was organophilic and hydrophobic. Upon chemical analysis, the product was found to contain 94.45% $SiO_2$, 1.74% C, 0.78% H, and had a loss on ignition of 4.30%. The analysis corresponded to an esterification of 230 butoxy groups per 100 square millimicrons of surface area of siliceous substrate.

A comparison of Example 4 with Example 3 demonstrates again that heating to a higher temperature (650° C.) to activate the silica results in a subsequent increase in the amount of esterification obtained in comparison with silica activated at the lower temperature (550° C.). The amount of esterification obtained under the conditions of the present example is also substantially greater than that which results from esterification of non-activated hydrated precipitated amorphous silica under the identical esterification conditions.

Even after dehydration of the non-activated silica by azeotropic distillation with butanol followed by extended refluxing in anhydrous butanol, say, for a period of 8 hours, the esterification usually amounts to less than 200 butoxy groups per 100 square millimicrons of surface area of the siliceous substrate. Such products will consequently be organophilic but not highly hydrophobic in comparison with the highly esterified, organophilic and hydrophobic product of the instant example.

*Example 5.—Coherent aggregates of ultimate silica units having an average diameter of 19 millimicrons heated to 500° C. and esterified with ethanol in the vapor phase*

The siliceous substrate was prepared by the method described in Example 1 with the exception that the $SiO_2$ content decreased from 4% to 3% during the preparation of the "heel," and finally to 3.44% during the "build-up" step. The "heel" was prepared at a temperature of 90° C. over a period of 45 minutes.

The final dry powder consisted of coherent aggregates of coalesced, ultimate, dense silica units having an average unit diameter of 19 millimicrons as measured from electron micrographs. The specific surface area as measured by nitrogen adsorption ($S_n$) was 135 m.$^2$/g.

The dry silica prepared as described above was heated in air to a temperature of 500° C. and cooled in an anhydrous atmosphere. The silica was mixed with 3.4% of its weight of 95% ethyl alcohol by tumbling. The resulting mixture was then heated to a temperature of 100° C. in a closed glass container for a period of about one hour. The product was subsequently heated to a temperature of 130° C. in a container open to a dry atmosphere to drive off any unreacted alcohol.

The product was organophilic and upon chemical analysis was found to contain 93.96% $SiO_2$, 0.96% carbon, and had a loss on ignition of 4.56%. The esterification amounted to 178 ethoxy groups per 100 square millimicrons of surface of the internal structure. The specific hydroxylated surface area as determined by the adsorption of methyl red dye was 13 m.$^2$/g. The bulk density of the product under a compressive load of 3 p. s. i. was 0.25 g./cc.

This example demonstrates the substantial change in surface properties achieved by chemically reacting a heat activated siliceous surface with ethanol vapor at a temperature of 100° C. The specific hydroxylated surface area is reduced from about 135 m.$^2$/g. to 13 m.$^2$/g. The esterified product is organophilic and highly compatible with organic systems.

*Example 6.—Coherent aggregates of ultimate silica units heated to 500° C. and esterified with allyl alcohol*

The siliceous substrate was prepared as described in Example 5 except that the time for the preparation of the heel was 30 minutes and the specific surface area of the dry silica prepared was 120 m.$^2$/g. One pound of the dry silica was heated to 500° C. and cooled in an anhydrous atmosphere.

The heat-treated silica was mixed with 4.3% of its weight of allyl alcohol and was tumbled for a period of 24 hours at a temperature of 30° C. The product was organophilic and had a specific hydroxylated surface area of 34 m.$^2$/g. as determined by dye adsorption. By chemical analysis the product was found to contain 93.54% $SiO_2$ and 0.96% carbon. Thus the esterification amounted to 135 allyloxy groups per 100 square millimicrons of surface of the internal structure. The bulk density was 0.18 g./cc. under a compressive load of 3 p. s. i.

The above data demonstrate that chemical reaction with the surface of a heat activated silica can be obtained at room temperatures to produce marked changes in the surface characteristics of the silica. A large reduction in the specific hydroxylated surface area is noted. The transition from a silica which originally preferentially wet into the aqueous phase to one which preferentially wets into the butanol phase in a two-phase system of water and n-butanol has taken place.

*Example 7.—Coherent aggregates of ultimate silica units heated to 500° C. and esterified with isopropanol*

The siliceous substrate was prepared as described in Example 6. The esterification of the siliceous substrate was also carried out as described in Example 6, except that 4.5% of isopropyl alcohol was used in place of the allyl alcohol of Example 6. The product was organophilic and had a specific hydroxylated surface area of 46 m.$^2$/g. as determined by dye adsorption.

The results using a saturated alcohol, isopropanol in this instance, are thus seen to be similar to those obtained using an unsaturated alcohol as in Example 6.

*Example 8.—Coherent aggregates of ultimate silica units heated to 500° C. and esterified with isoamyl alcohol*

The siliceous substrate used in this example was substantially identical with that prepared in Example 6. The esterification of the substrate was carried out exactly as described in Example 6 except that 6.5% of isoamyl alcohol was employed in place of the allyl alcohol used in Example 6. The product was organophilic and had a specific hydroxylated surface area of 34 m.$^2$/g. as determined by dye adsorption.

The above example is similar to Examples 6 and 7 and demonstrates the use of still another alcohol.

*Example 9.—Precipitated reinforced coherent aggregates of ultimated silica units heated to 530° C. and esterified with n-butanol*

One volume of a solution of 0.48 N sulfuric acid was added at a uniform rate, over a period of 30 minutes, at a temperature of about 30° C., to three volumes of a solution of sodium silicate, containing 2% $SiO_2$ and having a molar $SiO_2:Na_2O$ ratio of 3.36. The amount of sulfuric acid solution was adjusted so that it was equivalent to 80% of the $Na_2O$ in the original sodium silicate. The pH during this process dropped from 11.3 to about 9. Violent agitation was provided to insure complete and instantaneous mixing. The temperature of the reaction mixture during the entire reaction was maintained below 40° C. The sodium ion concentration remained below 0.3 N throughout the process.

The clear sol resulting from the above process step and containing 1.5% $SiO_2$ (the so-called "heel") contained extremely tiny, discrete particles of silica. These particles were near the lower limit of colloidal dimensions and were so small that the solution remained almost water clear. Only a slight turbidity was noticed. The particles were too small to be measured by the electron microscope method and were less than 5 millimicrons average diameter.

The heel was heated to a temperature of 95° C. Solutions of sodium silicate and sulfuric acid were added simultaneously at a uniform rate over a period of about two hours. The sodium silicate solution contained 10% $SiO_2$ and had a molar $SiO_2:Na_2O$ ratio of 3.3. Enough 4% sulfuric acid solution (approximately equal in volume to the sodium silicate solution) was added so that 80% of the $Na_2O$ in the silicate solution was neutralized during the addition step.

The addition of silicate and acid was continued until one part of $SiO_2$ had been added for each part of $SiO_2$ present in the heel. During the additions the pH of the heel slowly rose from 9 to 10 and was then maintained at about 10. Vigorous agitation was employed so that the mixing was essentially instantaneous. The sodium ion concentration remained below 0.3 N throughout the process.

During the heating of the heel and the subsequent addition of silicate and acid, the tiny, discrete particles of the heel increased in size and then became chemically bound together in the form of open networks or coherent aggregates of supercolloidal size wherein the colloidal particles were present as dense ultimate units. The aggregates were precipitated.

To aid filtration, the slurry was further flocculated with 2% solution of a mixture of cetyl and lauryl trimethylammonium bromides, 0.16 percent of the bromide mixture being added, based on the weight of the silica.

The slurry was filtered and the wet filter cake reslurried in water. The reslurry was adjusted to about pH 7 with dilute sulfuric acid, and filtered. The filter cake was collected and then washer with water.

The filter cake as obtained on a vacuum filter contained about 12.5% by weight of $SiO_2$. The siliceous substrate reduced to powder form and dried in air at a temperature of 120° C. had a specific surface area of 297 m.²/g. Chemical analysis showed the silica to contain 94.82% $SiO_2$, 0.17% carbon, 0.16% hydrogen, 1.33% non-siliceous ash. Loss on ignition was 3.85%.

A sample of the material treated in the manner described above was heated at a temperature of from 470 to 530° C. for a period of one and one-half hours. It was subsequently cooled in a vacuum desiccator. Upon chemical analysis it was shown to contain 95.99% $SiO_2$, 0.81% non-siliceous ash, 0.04% carbon, and 0.39% hydrogen and had a loss on ignition of 3.20%. The specific hydroxylated surface area as determined by dye absorption was found to be 184 m.²/g.

The heat-treated sample was then heated in an excess of n-butanol at a temperature of 106° C. for a period of about one hour. The water concentration in the liquid phase was 0.81%. The sample was filtered, and dried for a period of 24 hours in a vacuum oven maintained at a temperature of 75° C. The product was organophilic.

Upon chemical analysis the product was found to contain 93.3% $SiO_2$, 2.40% carbon, 0.86% hydrogen, 1.11% non-siliceous ash. It had a loss on ignition of 5.59%. The specific hydroxylated surface area was 85.5 m.²/g. The esterification amounted to 104 butoxy groups per 100 square millimicrons of surface area of the internal structure.

This example demonstrates the esterification of a higher surface area silica than that used in Example 1. Again, a large decrease in the specfic hydroxylated surface area has been obtained. The esterification has caused the silica to become organophilic.

I claim:

1. A process which comprises the steps of heating, at a temperature of from 300 to 800° C., a material having an internal structure of an inorganic, water-insoluble, siliceous solid in a supercolloidal state of subdivision having a specific surface area of at least 25 m.²/g. and bearing a sufficient proportion of surface silanol groups that the hydroxylated surface area is greater than 85% of the total surface area, the time of heating being sufficient to activate the surface of said solid and reduce its specific hydroxylated surface area to less than 85 percent of its specific surface area, and thereafter chemically reacting with the activated solid an alcohol of the formula ROH, in which R is a hydrocarbon radical having from 2 to 18 carbon atoms wherein the carbon attached to oxygen is also attached to hydrogen, the silica being cooled, prior to contact with the alcohol, to a temperature below the thermal decomposition temperature of the alcohol and being maintained in a dry atmosphere after the activation until contact with the alcohol is effected, said reaction with alcohol being effected at a temperature in the range from 30° C. to the thermal decomposition temperature of the alcohol and while the water content of the reaction system is maintained below 3 percent by weight based on the alcohol present and being continued until the product is sufficiently organophilic that it is preferentially wetted by butanol in a butanol-water mixture.

2. A process which comprises the steps of heating in the presence of air, at a temperature of from 300 to 800° C., a material having an internal structure of an inorganic, water-insoluble, siliceous solid in a supercolloidal state of subdivision having a specific surface area of at least 25 m.²/g. and bearing a sufficient proportion of surface silanol groups that the hydroxylated surface area is greater than 85% of the total surface area, the time of heating being sufficient to activate the surface of said solid and reduce its specific hydroxylated surface area to less than 85 percent of its specific surface area, and thereafter chemically reacting with the solid an alcohol in the vapor phase, the alcohol having the formula ROH, in which R is a hydrocarbon radical having from 2 to 18 carbon atoms wherein the carbon attached to oxygen is also attached to hydrogen, the silica being cooled, prior to contact with the alcohol, to a temperature below the thermal decomposition temperature of the alcohol and being maintained in a dry atmosphere after the activation until contact with the alcohol is effected, said reaction with alcohol being effected at a temperature in the range from 30° C. to the thermal decomposition temperature of the alcohol and while the water content of the reaction system is maintained below 3 percent by weight based on the alcohol present, and the reaction being continued until at least 100 —OR groups per 100 square millimicrons of surface area of said solid are chemically bound thereto.

3. A process which comprises the steps of heating in the presence of air, at a temperature of from 400 to 700° C., a material having an internal structure of an inorganic, water-insoluble, siliceous solid in a supercolloidal state of subdivision having a specific surface area of at least 25 m.²/g. and bearing a sufficient proportion of surface silanol groups that the hydroxylated surface area is greater than 85% of the total surface area, the time of heating being sufficient to activate the surface of said solid and reduce its specific hydroxylated surface area to less than 85 percent of its specific surface area, and thereafter chemically reacting the solid with a liquid alcohol of the formula ROH in which R is a hydrocarbon radical having from 2 to 18 carbon atoms wherein the carbon attached to oxygen is also attached to hydrogen the silica being cooled, prior to contact with the alcohol, to a temperature below the thermal decomposition temperature of the alcohol and being maintained in a dry atmosphere after the activation until contact with the alcohol is effected, said reaction with alcohol being effected at a temperature in the range from 30° C. to the thermal decomposition temperature of the alcohol and while the water content of the reaction system is maintained below 3 percent by weight based on the alcohol present, and the reaction being continued until at least 200 —OR groups per 100 square millimicrons of surface area of said solid are chemically bound thereto.

4. A process which comprises the steps of heating in the presence of air, at a temperature of from 400 to 700° C., a material having an internal structure of an inorganic, water-insoluble, siliceous solid in a supercolloidal state of subdivision having a specific surface area of at least 25 m.²/g. and bearing a sufficient proportion of surface silanol groups that the hydroxylated surface area is greater than 85% of the total surface area, the time of heating being sufficient to activate the surface of said solid and reduce its specific hydroxylated surface area to less than 85 percent of its specific surface area, and thereafter chemically reacting the solid with a liquid alcohol of the formula ROH in which R is a hydrocarbon radical having from 2 to 18 carbon atoms wherein the carbon attached to oxygen is also attached to hydrogen, the silica being cooled, prior to contact with the alcohol, to a temperature below the thermal decomposition temperature of the alcohol and being maintained in a dry atmosphere after the activation until contact with the alcohol is effected, said reaction with alcohol being effected at a temperature in the range from 30° C. to the thermal decomposition temperature of the alcohol and while the water content of the reaction system is maintained below 3 percent by weight based on the alcohol present, and the reaction being continued until the resulting product is organophilic and hydrophobic.

No references cited.